US011678766B2

(12) United States Patent
Benson et al.

(10) Patent No.: US 11,678,766 B2
(45) Date of Patent: Jun. 20, 2023

(54) FIREBOX FOR A GRILL

(71) Applicants: Stephen Benson, Rockford, IL (US); Jaron Benson, Rockford, IL (US)

(72) Inventors: Stephen Benson, Rockford, IL (US); Jaron Benson, Rockford, IL (US)

(73) Assignee: HOME FIRES INC., Rockford, IL (US)

( * ) Notice: Subject to any disclaimer, the term of this patent is extended or adjusted under 35 U.S.C. 154(b) by 36 days.

(21) Appl. No.: 16/884,725

(22) Filed: May 27, 2020

(65) Prior Publication Data

US 2020/0281404 A1 Sep. 10, 2020

Related U.S. Application Data

(63) Continuation of application No. PCT/US2018/062459, filed on Nov. 26, 2018.

(60) Provisional application No. 62/591,066, filed on Nov. 27, 2017.

(51) Int. Cl.
*A47J 37/07* (2006.01)

(52) U.S. Cl.
CPC ....... *A47J 37/0759* (2013.01); *A47J 37/0704* (2013.01); *A47J 37/0786* (2013.01)

(58) Field of Classification Search
CPC ........ A47J 37/06; A47J 37/07; A47J 37/0704; A47J 37/0759; A47J 37/0786
See application file for complete search history.

(56) References Cited

U.S. PATENT DOCUMENTS

| 2,419,344 | A | * | 4/1947 | Eggleston | A47J 37/0763 |
| | | | | | 126/25 R |
| 3,665,870 | A | * | 5/1972 | Lewicki | F23M 5/00 |
| | | | | | 110/317 |
| 3,925,856 | A | * | 12/1975 | Plummer, III | A44B 19/16 |
| | | | | | 24/586.1 |
| 4,773,386 | A | * | 9/1988 | Archer | A47J 37/06 |
| | | | | | 110/300 |

(Continued)

FOREIGN PATENT DOCUMENTS

| CN | 105725835 A | 7/2016 |
| CN | 105795935 A | 7/2016 |

(Continued)

OTHER PUBLICATIONS

Youtube, Replacing the firebox in a Kamado Joe, Jun. 6, 2017, Internet Website, 1 page (first video frame only) https://www.youtube.com/watch?v=sa6t4QGETbw.

(Continued)

*Primary Examiner* — Michael G Hoang
*Assistant Examiner* — Logan P Jones
(74) *Attorney, Agent, or Firm* — Reinhart Boerner Van Deuren P.C.

(57) ABSTRACT

A firebox for a grill is provided. The firebox has a shell, an insulation layer, and a firebrick layer. The firebrick layer comprising a plurality of firebricks that form an inner peripheral surface of the firebox. The insulation layer formed between the firebrick layer and the shell or the insulation layer forming the outermost layer of the firebox. The shell preventing the collapse and/or unwanted airflow into the internal cavity of the firebox if a fracture is formed in the firebrick layer.

19 Claims, 15 Drawing Sheets

(56) References Cited

U.S. PATENT DOCUMENTS

| | | | | |
|---|---|---|---|---|
| 5,024,208 | A * | 6/1991 | Hottenroth | A47J 37/0763 126/25 R |
| 6,050,256 | A * | 4/2000 | French | A47J 37/0704 126/25 R |
| 6,564,960 | B1 * | 5/2003 | Grindstaff | A01G 9/026 217/12 R |
| 9,504,353 | B1 | 11/2016 | Benson et al. | |
| 2010/0258106 | A1 * | 10/2010 | Simms, II | A47J 37/0704 126/25 R |
| 2011/0283990 | A1 * | 11/2011 | Walters | A47J 37/0759 126/25 R |
| 2017/0238760 | A1 * | 8/2017 | Fagg | A47J 37/0786 |
| 2017/0370593 | A1 * | 12/2017 | Kohli | A47J 37/0704 |
| 2018/0180286 | A1 * | 6/2018 | Brennan | A47J 37/0704 |
| 2018/0310762 | A1 * | 11/2018 | Schlosser | A47J 37/0704 |

FOREIGN PATENT DOCUMENTS

| | | |
|---|---|---|
| CN | 205410951 U | 8/2016 |
| CN | 105982572 A | 10/2016 |
| EP | 2267351 A1 | 12/2010 |
| ES | 1071083 U | 12/2009 |

OTHER PUBLICATIONS

"Kamado Joe Big Joe II Ceramic Grill", *AuthenTEAK, LLC.* (Website), Aug. 18, 2017, 2 pages. URL: https://authenteak.com/kamado-joe-big-joe-ceramic-grill/.

\* cited by examiner

FIREBOX FOR A GRILL

CROSS-REFERENCE TO RELATED PATENT APPLICATIONS

This patent application is a continuation of International Application No. PCT/US2018/062459, filed Nov. 26, 2018, which claims the benefit of U.S. Provisional Application No. 62/591,066, filed Nov. 27, 2017, the entire teachings and disclosure of which are incorporated herein by reference thereto.

FIELD OF THE INVENTION

The present invention relates generally to grill for cooking, and more particularly to a firebox for a grill.

BACKGROUND OF THE INVENTION

Many modern grills have a firebox having a single piece ceramic design. Using ceramics in the firebox has many advantages over other materials, mainly the excellent heat retention.

Ceramic fireboxes can retain heat for long periods of time, making them extremely versatile as they can be used for grilling, smoking, and baking. This allows for the grill to have consistent temperatures as low as 225° F. and as high as 750°+F.

In addition, using a vent system typical in grills, precise control of airflow can be maintained, allowing the grill to function much like wood-fired ovens and they can be used to smoke, roast or bake anything.

However, modern grills are not without their downsides. For example, one major problem for grill and firebox manufacturers is the fracturing of the single piece design of the ceramic fireboxes typically employed within the grills.

Indeed, many grill manufacturers include full warranties on their single piece design ceramic fireboxes to alleviate the customers' concerns about having to replace the firebox as a result of a fracture in the ceramics.

In addition, many customers will not buy a grill without a full warranty on a single piece design ceramic firebox as a fracture in the firebox may alter the flow of air in the grill and may lead to its collapse. Indeed, the number one warranty item that customers request replacement of is the single piece design ceramic fireboxes and its related components.

The reason that customers request that their single piece design ceramic firebox be replaced is that a fracture in the firebox can make it more difficult for a user to control the internal temperature of the grill.

As will be understood, the reason that the internal temperature becomes difficult to control is that the fracture in the firebox provides a space for air to flow into or out of the firebox, which will either supply too much or too little oxygen to the burning material can create either too much or too little combustion within the grill.

Further, even just a crack in a single piece design ceramic firebox can cause the opening surrounding the interior cavity of the firebox to shift or expand as a result of the crack, which can cause the cooking grid that typically sits atop the firebox to fall within the internal cavity of the firebox.

In addition, cracks through the interior cavity of a single piece design firebox may allow charcoal or any other burning material being used or the debris and ash from its combustion to fall through the crack and build up over time, which can affect the functioning of the grill over time.

Worse yet, due to the nature of ceramics, over time even a small fracture in a single piece design ceramic firebox will often grow causing the firebox to eventually collapse and leave the grill useless until the firebox is replaced.

Therefore, a firebox for use with a grill that provides all of the benefits of a single piece design ceramic firebox without having the problems associated with breakage, altering the air flow, and other issues, due to a fracture in the ceramics of the firebox would be beneficial.

Further, another problem for grill and firebox manufacturers relates to the shipping of the single piece design ceramic fireboxes either new or as a replacement to fulfill their warranty. This is due to the tendency for the ceramic fireboxes to fracture during shipping due to the brittle nature of ceramic materials.

Therefore, a firebox for a grill that provides all of the benefits of a single piece design ceramic firebox without having the problems associated with the shipment of a single piece design ceramic firebox would be beneficial.

The invention provides such a firebox that includes a shell for securing a plurality of firebricks to form a firebrick layer and provides an insulating and supportive element for the firebox that results in a stronger, more durable, and more efficient firebox than those generally known in the art. These and other advantages of the invention, as well as additional inventive features, will be apparent from the description of the invention provided herein.

BRIEF SUMMARY OF THE INVENTION

In one aspect, the invention provides a firebox having a shell and a plurality of firebricks defining an inner peripheral surface.

In other aspects, the firebox also having insulation layer and an ash pan that can be inserted and removed from within the interior cavity of the firebox.

In another aspect, the firebox includes a basket for holding a fire grate that can be inserted and removed from within an interior cavity of the basket.

In another aspect, the basket will include a handle.

In another aspect, the insulation layer will take the form of an air pocket formed between the shell and the plurality of firebricks.

In yet another aspect, the insulation layer will take the form of a fibrous insulation material.

In another aspect, the shell of the firebox will be a single piece design comprised of sheet metal.

In another aspect, the shell will have an exterior surface having a first coupling notch adjacent a first end of the shell and a second coupling notch adjacent a second end of the shell.

In another aspect, the coupling member will be removably coupled to the first and second coupling notch to pull together the first and second ends of the shell, such that the plurality of firebricks will abut against one another to form a firebrick layer.

In another aspect, the firebox will include an air inlet going from the exterior of the firebox to an internal cavity of the firebox.

In another aspect, the firebox also including a port opening extending between an exterior of the firebox and an internal cavity of the firebox.

In another aspect, the shell defines an outer peripheral surface of the firebox and the insulation layer is interposed between the shell and the firebrick layer.

In another aspect, the insulation layer will be interposed between an outer radial surface of the shell and an inner peripheral surface of a shield.

In another aspect, the shell comprises an inner wall and an outer wall and the insulation layer is spaced between the inner wall and outer wall of the shell.

In another aspect, the inner wall and the outer wall of the shell have a tapered region.

In another aspect, at least one of the plurality of firebricks has a spacer projecting from an outer radial surface of the firebrick.

In another aspect, at least of the plurality of firebricks has a hollowed out portion located on the outer radial surface of the firebrick.

According to another aspect of the present application, a firebox is provided having a shell having an inner wall and an outer wall and a firebrick layer comprising a plurality of refractory bricks defining an internal cavity. The firebox having an insulation layer between the inner wall and outer wall of the shell and an air inlet passing through the firebox to allow for the passage of air from the exterior of the body into the internal cavity of the firebox.

In another aspect, the insulation layer of the firebox taking the form of a pocket of air between the inner wall and the outer wall of the shell.

In another aspect, the insulation layer takes the form of a fibrous insulation material.

In another aspect, the shell is made of a single piece of sheet metal.

In another aspect, the shell has an exterior surface having a first coupling notch adjacent a first end of the shell and a second coupling notch adjacent a second end of the shell.

In yet another aspect, a coupling member will be removably coupled to the first and second coupling notch to pull together the first and second end of the shell.

In another aspect, a fractured refractory brick can be replaced by uncoupling the coupling member from the first and second notch and removing the fractured refractory brick from a body of the firebox. Then a new unfractured refractory brick being inserted within the body of the firebox to replace the fractured refractory brick. The coupling together the first and second notch with the coupling means.

In another aspect, the plurality of refractory bricks take the form of firebricks.

In another aspect, the plurality of refractory bricks take the form of ceramic bricks.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
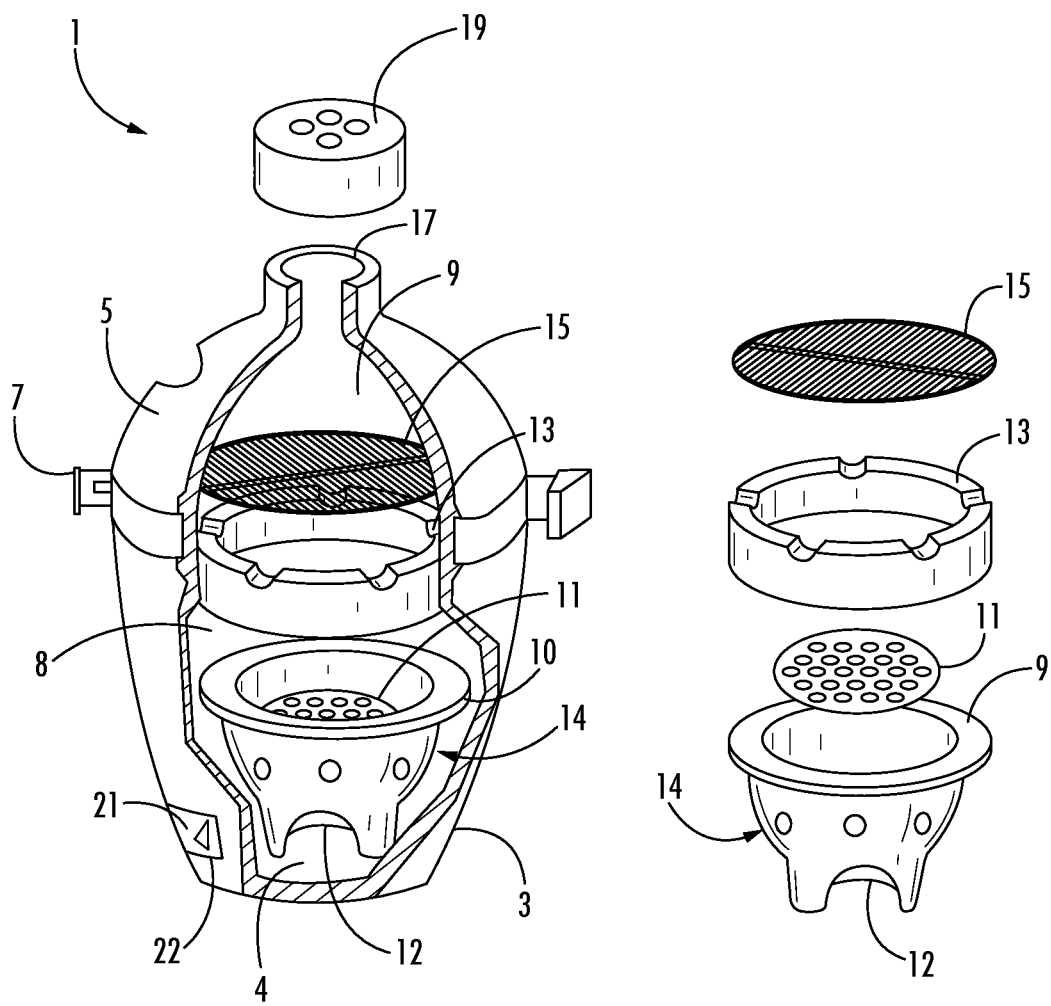
FIG. 1 illustrates a schematic view of a typical grill generally known in the art.

FIG. 1 illustrates an example of a grill 1 generally known in the art. The grill 1 has a body 3 and a lid 5. The lid 5 can be opened and closed over the body 3 using handles 7.

The grill 1 includes a lower internal cavity 8 defined by the body 3 and an upper internal cavity 9 defined by the lid 5.

At the bottom of the lower internal cavity 8 of the body 3 is a bottom wall 4. A single piece design ceramic firebox 10 is inserted into the lower internal cavity 8 of the body 3 and placed on the bottom wall 4. The firebox 10 holds a fire grate 11 that will in turn hold the burning material, such as lump. A fire ring 13 sits proximate to the firebox 10 and holds a grilling grate 15 where food is placed for cooking by the grill 1.

Figure 2:
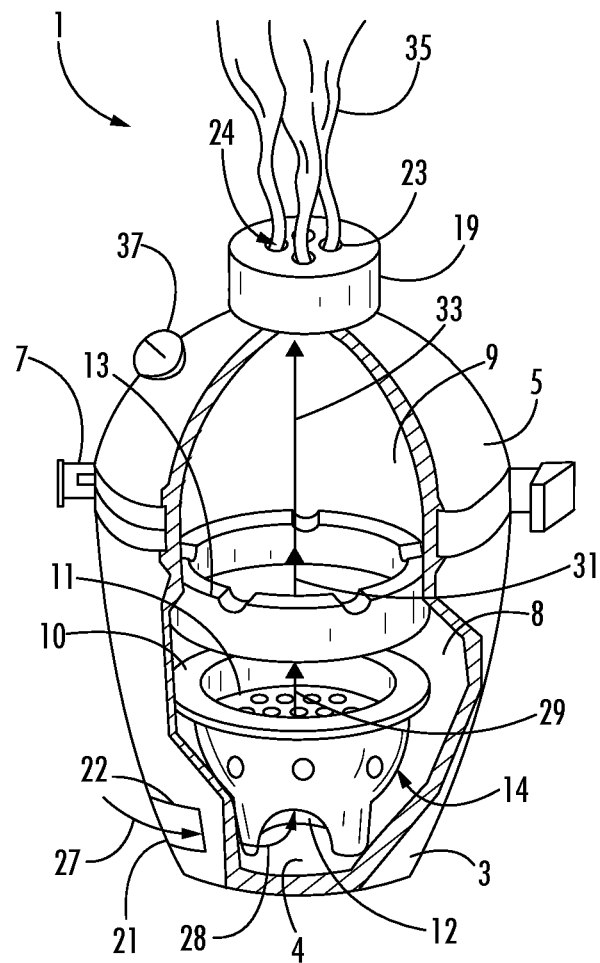
FIG. 2 illustrates the grill of FIG. 1 and further illustrates the typical air flow in grills generally known in the art.

The body 3 of the grill 1 has a draft door 21 that is moveable from a completely closed position, as illustrated in FIG. 1, to a completely open position, as illustrated in FIG. 2. When the draft door 21 is not in the completely closed position the opening that it provides through the body 3 defines an air inlet 22 of the grill 1.

Likewise, the lid 5 of the grill 1 has an outlet 17 that is covered with a top cap 19. The top cap 19 has vents 23 that are moveable from a completely closed position, as illustrated in FIG. 1, to a completely opened position, as illustrated in FIG. 2. When the vents 23 are not in the completely closed position they provide an air outlet 24 that allows air to escape from the grill 1 into the external environment.

Turning to FIG. 2 demonstrating the air flow through a properly functioning grill 1.

In use, a burning material, such as but not limited to, lump charcoal or wood chips, will be placed on the fire grate 11 atop the single piece ceramic firebox 10 and ignited. After ignition of the burning material, oxygen must be provided to the burning material if combustion of the burning material is to be maintained.

To provide the necessary oxygen, the draft door 21 can be moved from the completely closed position, as illustrated in FIG. 1, to the completely open position, as illustrated in FIG. 2, or to any position therebetween.

Once the draft door 21 has been opened to define the air inlet 22 cool air will enter the air inlet 22 as is generally indicated at numeral 27. The cool air that has entered the air inlet 22 will then pass through the air inlet 22 of the firebox 10, as generally indicated at reference numeral 28.

The air will then flow upward and through the grilling grate 11 where it will be used in the combustion of the ignited burning material sitting atop the fire grate 11 of the firebox 10, as is generally indicated by the airflow at reference numeral 29.

The combustion of the burning material heats the air, and following the rules of thermodynamics, the warmer air will rise past the fire ring 13 and the grilling grate 15, as is generally indicated by reference numeral 31. As the heated air passes through the fire ring 13 and grilling grate 15 it will cook any food that has been placed on the grilling grate 15.

After passing over the grilling grate 15 the heated air will then enter the internal cavity 9 of the lid 5, as is generally indicated by reference numeral 33. As the heated air enters the internal cavity 9 of the lid 5 it will circulate within the internal cavity of the lid 5.

If the vents 23 in the top cap 19 are closed the heated air will continue to circulate around the internal cavity 9 of the lid 5 and the internal cavity 8 of the body 3 where the already heated air can to be reheated by the combusting of the burning material.

If the vents 23 in the top cap 19 are open or partially opened the air circulating within the lid 5 will follow the rules of thermodynamics and the hottest air will rise to the top of the interior cavity 9 of the lid 5 before escaping through the air outlet 24 provided by the vents 23 and into the external environment surround the grill 1.

Thus, to control the temperature within the grill 1, a user will adjust opening size of the air inlet 22 and the opening size of the air vents 23.

As will also be understood, a user can also simultaneously adjust the air inlet 22 via the draft door 21 and the air outlet 23 via the air vents 23 to change the internal temperature of the grill 1.

The increase and decrease of the internal temperature of the grill 1 can be monitored by a temperature gauge 37, which instructs the user if any action needs to be taken to either increase or decrease the internal temperature within the grill 1 based on the specific instructions for the food being cooked with the grill 1.

Figure 3:
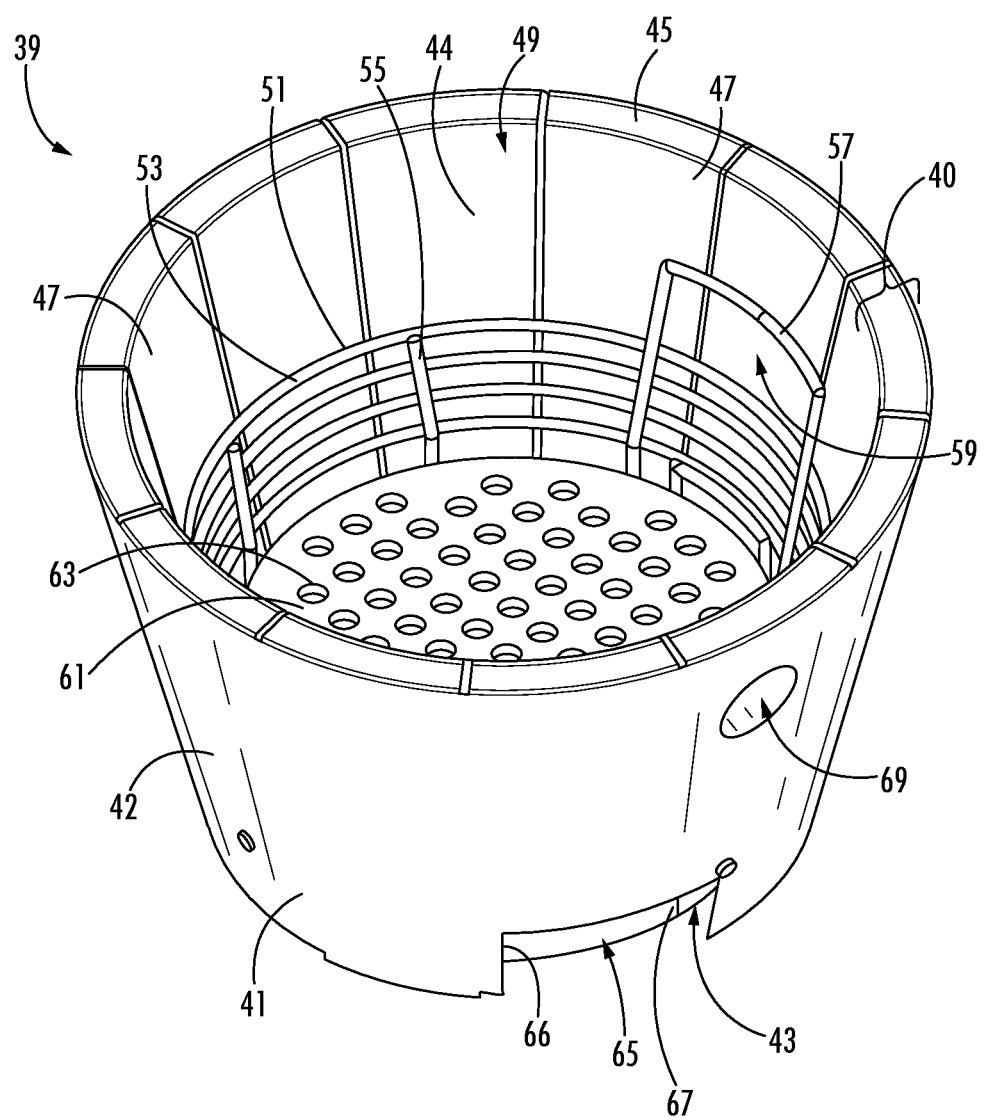
FIG. 3 illustrates a perspective view of a firebox according to one aspect of the present application.

Turning to FIG. 3 illustrating a perspective view of a firebox 39 according to one aspect of the present application. The firebox 39 has a body 40 comprising a shell 41, an insulation layer 43, and firebrick layer 45.

The shell 41 defines the outer peripheral surface 42 of the firebox 39 and the firebrick layer 45 defines an inner peripheral surface 44 of the firebox 39. The insulation layer 43 being spaced between the shell 41 and the firebrick layer 45.

The thermal insulation layer 43 can take the form of any thermal insulation material or any thermal insulation technique generally known in the art. However, most types of thermal insulation materials and techniques work by trapping a gas, such as air, within the thermal insulation. Further, many thermal insulations will further augment their effectiveness by trapping the air into small pockets, which helps to prevent the transfer of heat by convection between the trapped air pockets.

In one embodiment, the insulation layer 43 may take the form of a fibrous insulation material, such as, but not limited to, Fiberglass, Mineral Wool, Cellulose, Plastic Fiber, or Natural Fiber. As will be understood, fibrous insulation materials works by capturing air within their fibers in order to prevent heat transmission through convection.

In another embodiment, the insulation layer may take the form of an air bubble insulation material, such as, but not limited to, an aluminum air bubble insulation material. As will be understood, the air from the air bubbles will prevent the transmission of heat through convection.

In some embodiments, the insulation layer may take the form of an air pocket formed between the shell 41 and the firebrick layer 45 of the firebox 39.

Figure 10:
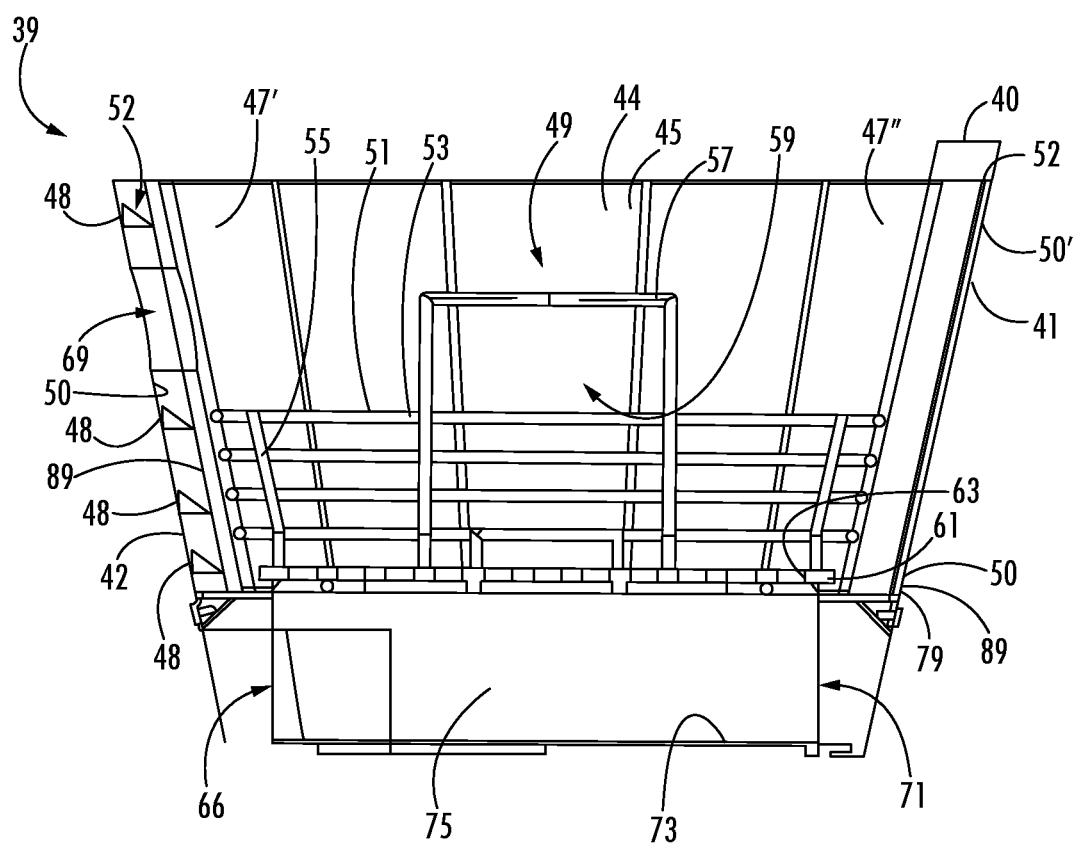
FIG. 10 is a cross-sections side view of another embodiment of a firebox according to one aspect of the present application.

For example, turning to FIG. 10, in one embodiment the shell 41 may include a projection 48 or a number of projections 48 that extend from an inner peripheral surface 89 of the shell 41 and make contact with the outer radial wall 50 of a firebrick 47' in order to create an air pocket 52 between the shell 41 and the firebrick layer 45.

As also illustrated in FIG. 10, in another embodiment the firebrick layer 45 may be composed of firebricks 47" that have an outer radial wall 50' with a rough and textured surface such that air pockets 52 are naturally formed between the rough and textured surface on the outer radial wall 50' of the firebricks 47" and the smoother inner peripheral surface 89 of the shell 41.

Figure 11:
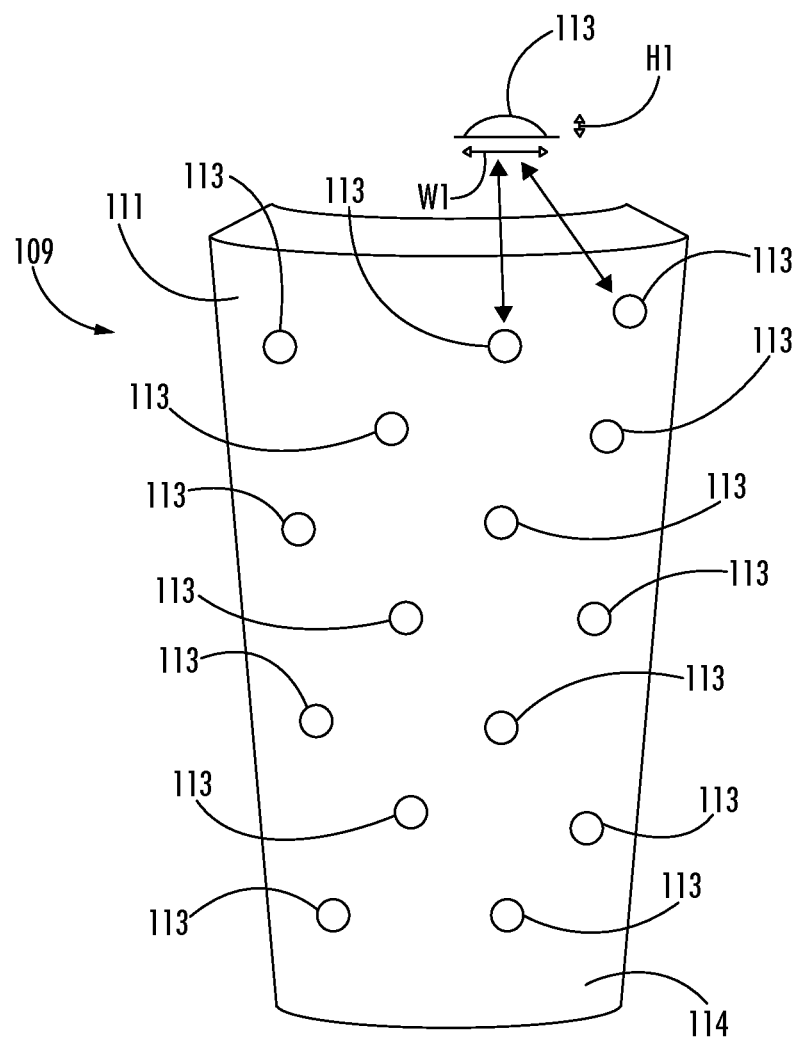
FIG. 11 is an exemplary embodiment of a firebrick according to one aspect of the present application having circular spacers on its outer radial wall.

Turning to FIG. 11, illustrating one embodiment of a firebrick 109 for use in a firebrick layer 45 of a firebox 39. The firebrick 109 has an outer radial wall 111 with circular spacers 113 dispersed between a smooth surface of the outer radial wall 111.

In a preferred embodiment, the circular spacers 113 will have a height H1 between 1 and 5 mm and a width W1 between 6 and 10 mm.

In a more preferred embodiment, the circular spacers 113 will have a height H1 of 3 mm and the width of 8 mm.

As will be understood, when the firebrick 109 is rested against the inner peripheral surface 89 of the shell 41 the circular spacers 113 will make contact with the inner peripheral wall 89 of the shell 41. As the circular spacers 113 make contact with the inner peripheral wall 89 of the shell 41 a natural space or air pocket 52 (see FIG. 10) is formed between the smooth surface 114 of the firebrick 109 and the inner peripheral wall 89 of the shell 41. The space or natural air pocket formed created between the outer radial wall 111 of the firebrick 109 and the inner peripheral wall 89 of the shield can then act as the insulation layer 43 of the firebox 39.

Figure 12:
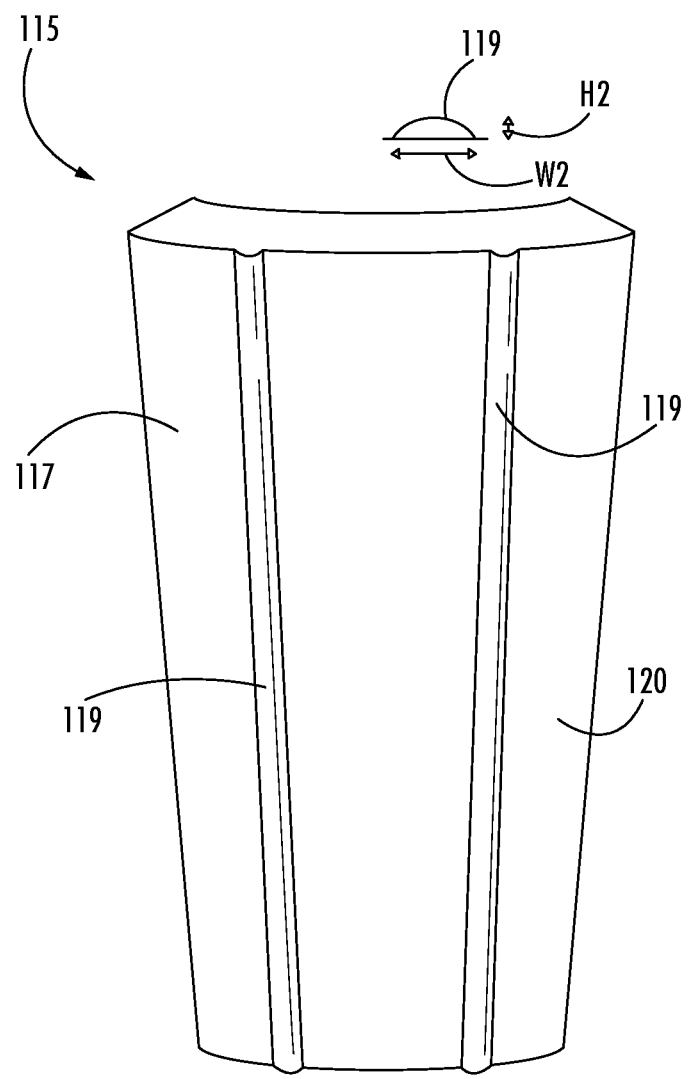
FIG. 12 is an exemplary embodiment of a firebrick according to one aspect of the present application having rounded spacers on its outer radial wall.

Turning to FIG. 12, illustrating another embodiment of a firebrick 115 for use in a firebrick layer 45 of a firebox 39. The firebrick 115 has an outer radial wall 117 with round spacers 119 dispersed between a smooth surface 119 of the outer radial wall 117.

In a preferred embodiment, the round spacers 119 will have a height H2 between 1 and 5 mm and the width W2 between 5 and 15 mm.

In a more preferred embodiment, the round spacers 119 will have a height H2 of 3 mm and a width of 10 mm.

As will be understood, when the firebrick 115 is rested against the inner peripheral surface 89 of the shell 41 of a firebox 39 the rounded spacers 119 will make contact with the inner peripheral wall 89 of the shell 41 to form a natural space or air pocket 52 (see FIG. 10) between the smooth surface 120 of the outer radial wall 117 of the firebrick 109 and the inner peripheral wall 89 of the shell 41. The natural space or air pocket 52 formed between the outer radial wall 117 of the firebrick 109 and the inner peripheral wall 89 of the shell 41 can then act as an insulation layer 43 of the firebox 39.

Figure 13:
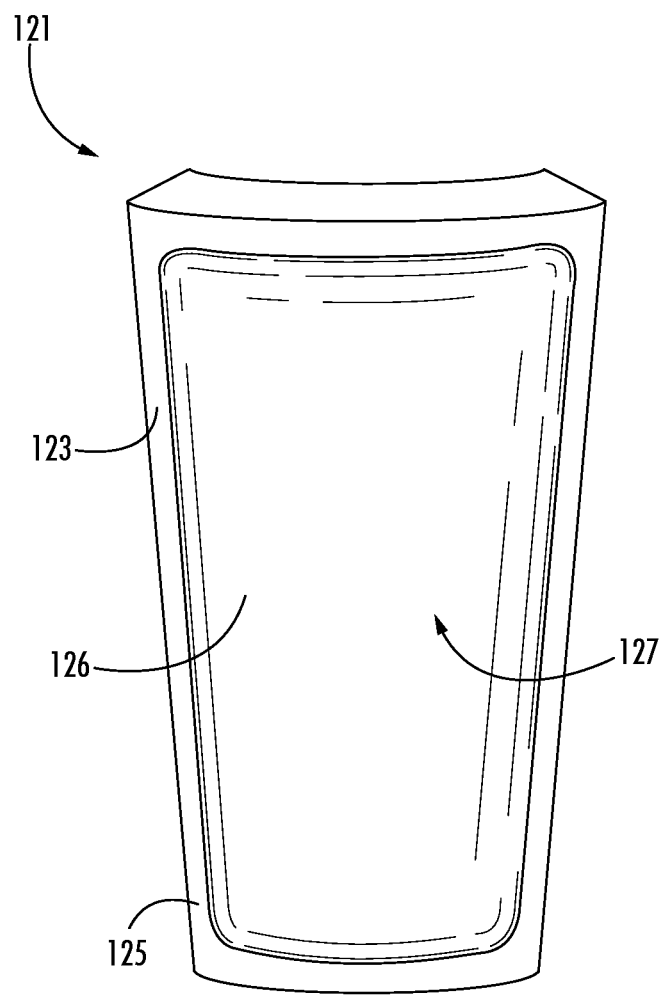
FIG. 13 is an exemplary embodiment of a firebrick according to one aspect of the present application having a hollowed out portion on its outer radial wall.

Turning to FIG. 13, illustrating another embodiment of a firebrick 121 for use in a firebrick layer 45 of a firebox 39. The firebrick 121 has an outer radial wall 123 having a first surface 125 and a second surface 126. The first surface 125 having a different depth on the outer radial wall 123 of the firebrick 121 than the second surface 126 such that a cavity 127 is formed on the outer radial wall 123 of the firebrick 121.

As will be understood, when the firebrick 121 is rested against the inner peripheral surface 89 of the shell 41 of a firebox 39 the first surface 125 will make contact with the inner peripheral wall 89 of the shell 41 to form a natural space or air pocket 52 (see FIG. 10) between the second surface 126 of the outer radial wall 123 of the firebrick 121 and the inner peripheral wall 89 of the shell 41. The natural space or air pocket 52 formed within the cavity 127 between the outer radial wall 123 of the firebrick 121 and the inner peripheral wall 89 of the shell 41 can then act as an insulation layer 43 of the firebox 39.

Turning back to FIGS. 3 and 4, in a preferred embodiment, the firebrick layer 45 will comprise a plurality of firebricks 47 that will define an internal cavity 49 of the firebox 39. Having a plurality of firebricks 47 instead of a single piece design ceramic firebox 10 (see FIGS. 1 and 2) provides some of the following advantages.

As will be understood, the firebricks 47 of the firebrick layer 45 can be composed of any refractory material capable of withstanding the internal temperatures of the grill 1, such as a firebrick, refractory brick, a block or brick of refractory ceramic material, or a block or brick of any type of refractory material generally know in the art.

Further, although the firebricks 47 are illustrated as having a typical brick or block shape the firebrick layer 45 is not meant to be limited only to using brick or block shaped firebricks 45. Indeed, it is envisioned by the Applicants that in other embodiments a plurality of any shaped refractory material may be used to form the firebrick layer 45.

Because ceramic materials tends to fracture before any plastic deformation takes place, objects made of ceramic completely fracture rather than having a more gentle failure that takes place over time, which is common in materials such as metals.

Therefore, as discussed above, replacing single piece ceramic fireboxes 10 is the most common warranty replacement requested by customers who purchased a grill 1 with a single piece design ceramic firebox 10.

Further, as also discussed above, in addition having to pay for the replacement of the single piece ceramic fireboxes 10, grill 1 manufacturers also have to use special packaging and shipping procedures to send both new and replacement single piece ceramic fireboxes to their customers.

Still yet, even with these special shipping procedures in place there is still a high likelihood that the single piece ceramic fireboxes 10 will be catastrophically fractured during shipping.

Therefore, if one of the plurality of firebricks 47 is catastrophically fractured it can simply be replaced with a new firebrick 47 without having to replace any of the other non-fractured firebricks 47 making up the firebrick layer 45.

An additional benefit of the firebox 39 using firebricks 47 to form the firebrick layer 45, is that if one of the firebricks 47 fractures the grill 1 manufacturer may just send a replacement firebrick 47, which eliminates the additional costs and risks associated with the shipment of the much larger single piece ceramic fireboxes 10 typical to in the current field of art.

Therefore, firebox 39 of the present application provides the additional benefit of only needing to replace a single fractured firebrick 47 to fix a fracture in its firebrick layer 47 rather than having to replace the entire firebox as would be required for grills 1 that use a single piece ceramic firebox 10.

Turning back to FIG. 3, within the internal cavity 49 of the firebox 39 is a basket 51 comprised of radial wire 53 secured together by axial wires 55. The basket 51 also includes a handle 57 that defines a basket handle opening 59 that is sized by be gripped by a human hand to allow for the easy removal of the basket 51 from the internal cavity 49 of the firebox 39.

The basket 51 holds a fire grate 61 that will hold the combustion material. The fire grate 61 has air inlets 63 that facilitate air flow through the fire grate 61 to supply the necessary oxygen needed for the combustion of the burning material sitting atop the fire grate 61.

The shape of the firebox 39 of the present application also provides advantages over the shape of the single piece ceramic fireboxes 10 that are generally known in the art. Specifically, the frustum, or more particularly, the conical frustum shape of the firebox 39 (see FIGS. 3 and 4) provides advantages over the rounded or bowl shape typically found in single piece ceramic fireboxes 10 (see FIGS. 1 and 2).

As single piece ceramic fireboxes 10 are made from a single piece of ceramic, the sidewalls are connected by a bowl portion 14 that traverses between the sidewalls of the single piece ceramic firebox 10 (see FIGS. 1 and 2). This bowl portion 14 takes up a good amount of the limited space within the internal cavity of the grill 1. However, the conical frustum shape of the firebox 39 of the present application does not have a bowl portion 14 that takes up the limited space within the internal cavity 8 of the grill, which gives the firebox 39 of the present application a larger volume above and below the fire grate 61.

In the firebox 39 of the present application, the additional volume above the fire grate 61 provides room for additional charcoal or other combustion material and the additional volume below the fire grate 61 provides for a larger ash pan 71. As will be understood, a larger charcoal or combustion material capacity will allow for fires to burn longer using the firebox 39 of the present application relative to a typical single piece ceramic firebox 10. In addition, a larger ash pan 71 capacity means not having to empty the ash pan 71 as would be needed using a typical single piece ceramic firebox 10.

In single piece ceramic fireboxes 10 the bowl portion 14 of the single piece ceramic fireboxes 10 at least partially block the flow of air between the air inlet 21 and the combustion material atop the fire grate 11 (see FIGS. 1 and 2). However, as discussed above, the firebox 39 of the present application does not include the bowl portion 14 to prohibit air flow from the air inlet 21 of a grill 1 to the combustion material sitting atop its fire grate 61.

As will be understood, by not having a bowl portion 14 to interfere with the air flow between the air inlet 21 of a grill 1 and the fire grate 61 it is much easier to ignite the charcoal or other combustion material on the fire grate 61 of the firebox 39 of the present application relative to the single piece ceramic fireboxes 10 generally known in the art.

In addition, a lip is created within the interior of typically rounded or bowl shaped single piece ceramic fireboxes 10 as their generally vertical sidewall curves into the general horizontal base of the bowl portion 14 (see FIGS. 1 and 2). In use, debris and ash from the burning of the combustion material will collect on this lip portion and build up overtime and become increasing difficult to clean.

As will be understood, the conical frustum shape of the firebox 39 of the present application does not have a lip portion for ash and debris to build up, which makes the cleaning and up keep of the firebox 39 much easier and manageable than the rounded or bowl shaped design of typical single piece ceramic fireboxes 10 generally known in the art.

Also, the conical frustum shape of the firebox 39 allows for a fire grate 61 having a larger surface area than the fire grates 11 typically used in single piece ceramic fireboxes 10. As will be understood, having a fire grate 61 with a larger surface area provides more space for charcoal or other combustible material, which allows for fires to burn longer without having to continuously replenish the charcoal or other combustible material being used as fuel for the fire.

In addition, the fire grate 61 in the present application is much more accessible to a user compared to the fire grates 11 typically used in single piece ceramic fireboxes 10 (see FIGS. 2 and 3). This makes it much easier for a user to load the charcoal or other combustion material onto the fire grate 61, ignite the charcoal or other combustion material while it is on the fire grate 61, and clean the debris and ash that accumulates on the fire grate 61 due to the combustion of the charcoal or combustion material that is burned atop the fire grate 61.

The firebox 39 also has an air inlet 65 formed by provided by an opening 66 through the shell 41 and in one embodiment, an opening 67 through the firebrick layer 45. As will be understood, the insulation layer 43 will also have an opening aligned with the opening 66 of the shell 41 and in one embodiment, the opening 67 of the firebrick layer 45 to facilitate air flow if the insulation layer 43 does not take the form of an air pocket.

The air inlet 65 provides a passageway for air to enter the internal cavity 49 of the firebox 39 where it will pass through the openings 63 of the fire grate 61 to supply the oxygen needed for the combustion of the burning material resting atop the fire grate 61.

Typically, the draft door 21 of the grill 1 and the air inlet 65 of the firebox 39 will be aligned with one another to facilitate the flow of air between the external environment around the grill 1 and the internal cavity 49 of the firebox 39.

The firebox 39 also has a port opening 69 that extends through the shell 41, the insulation layer 43, and the firebrick layer 45, and provides a passage from the exterior of the firebox 39 into the internal cavity 49 of the firebox 39.

Fireboxes 39 having a port opening 69 can be used with a grill 1 having a feeder system that allows for a user to insert additional burning material into the firebox 39 without having to open the lid 5 of the grill 1, such as the one disclosed in U.S. Pat. No. 9,504,353, which is wholly owned by the assignee and whose entire disclosure is incorporated herein by reference.

Figure 4:
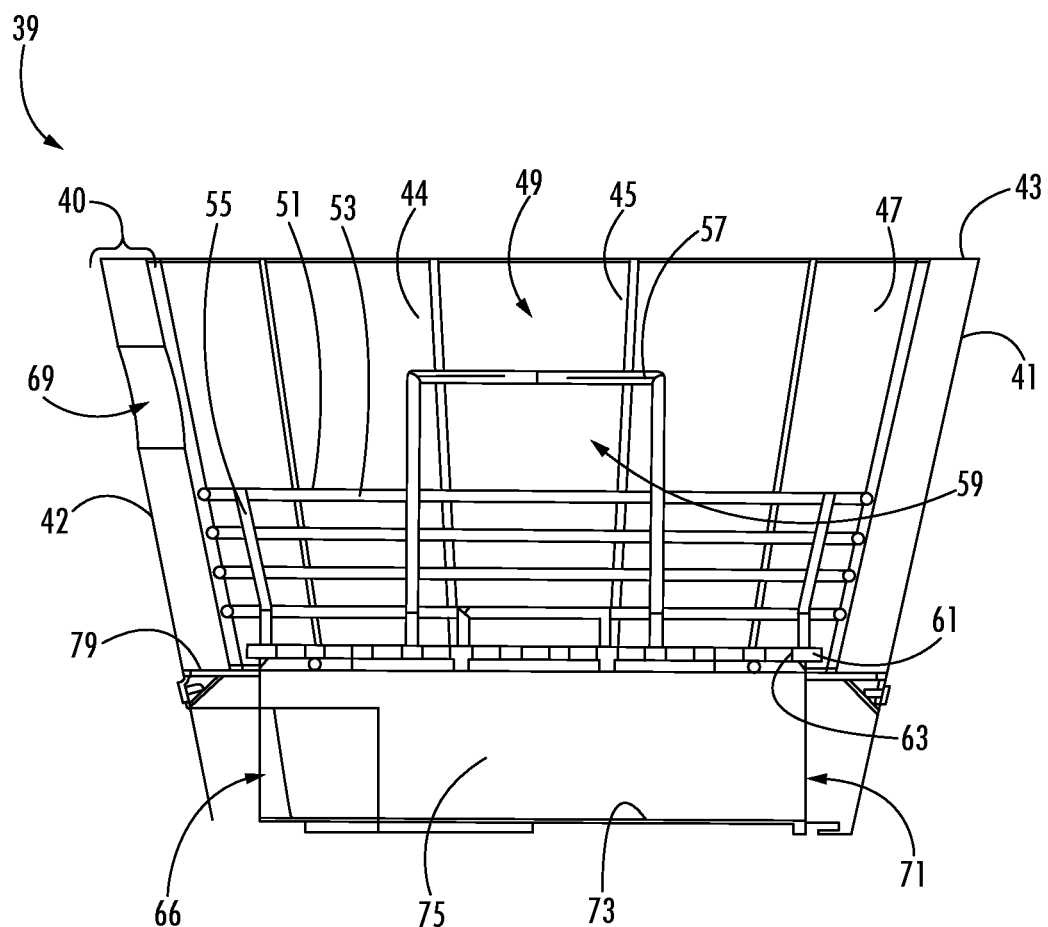
FIG. 4 illustrates a cross-sectional side view of the firebox of FIG. 3.

Turning to FIG. 4, illustrating a cross-sectional side view of the firebox 39 of FIG. 3.

As illustrated, the firebox 39 also includes a lift out ash pan 71 (hereinafter "ash pan 71"). The ash pan 71 has a base 73, a sidewall 75, and a lip 79. The lip 79 extends radially outward from the sidewall 75 to provide a surface for the basket 55 to sit atop while in the internal cavity 49 of the firebox 39.

The firebox 39 of the present application has a design that allows for the ash pan 71 to have a much larger volume than the ash pans typically found in single piece ceramic fireboxes 10. This provides the additional benefit of not having to clean out the ash pan 71 as frequently as the ash pans typically used with single piece ceramic fireboxes 10.

Figure 5:
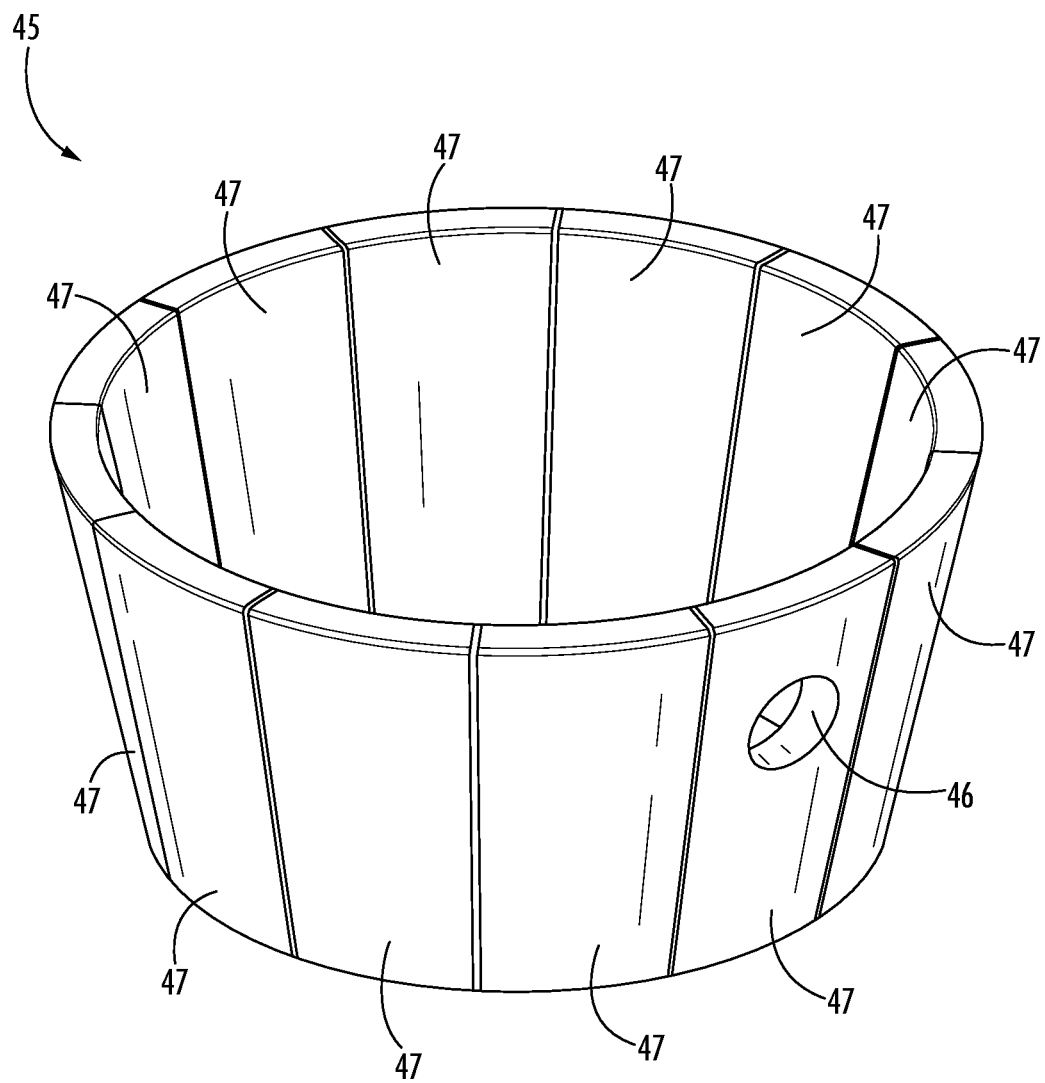
FIG. 5 illustrates a top perspective view of a firebrick layer according to one aspect of the present application.

FIG. 5 illustrates a stand-alone perspective view of the firebrick layer 45. The firebrick layer 45 comprising a number of firebricks 47. One of the firebricks 47 including an opening port 46 that extends through the firebrick 47 and provides a passage from the exterior of the firebrick layer 45 into the internal cavity 49 of the firebox 39 (see FIG. 4).

Figure 6:
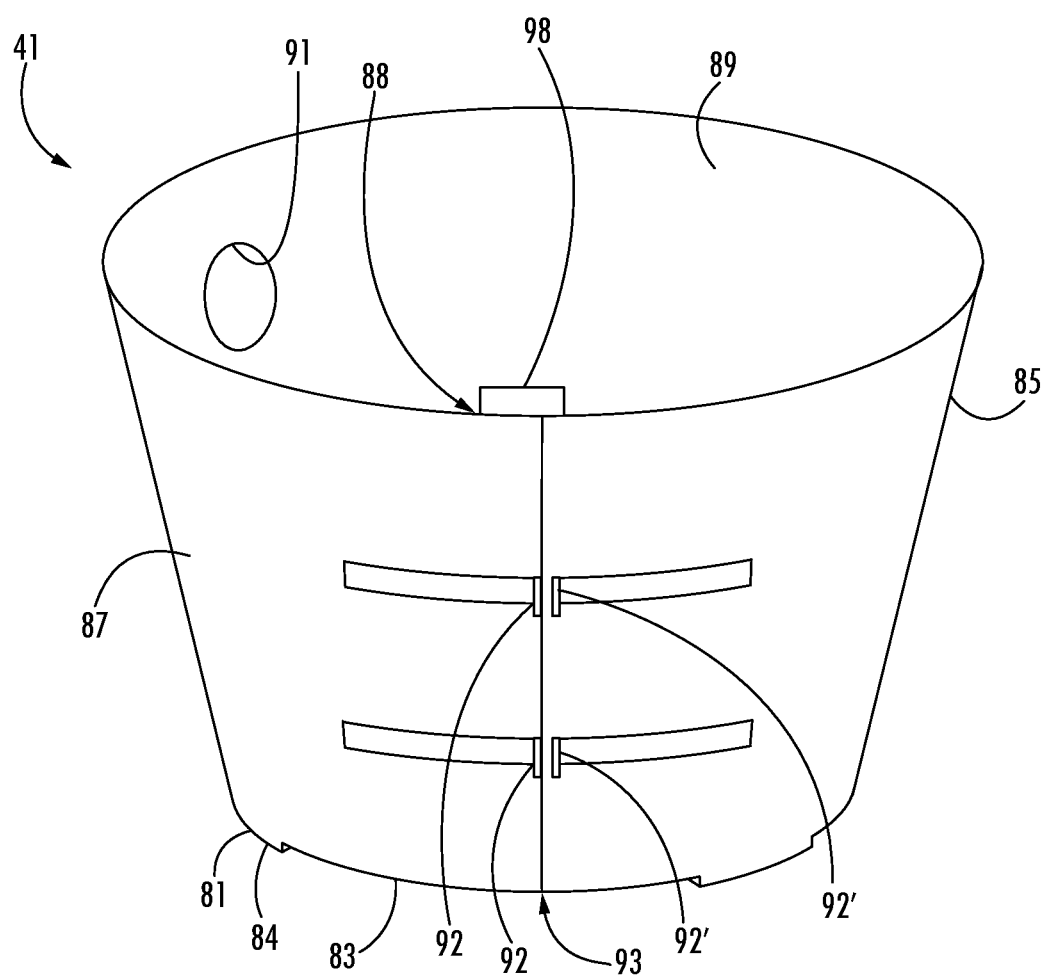
FIG. 6 illustrates a perspective view of the shell of the firebox illustrated in FIG. 3.

FIG. 6 illustrates a stand-alone perspective view of the shell 41 of the firebox 39 illustrated in FIG. 3. The shell 41 has a base 81 that includes a recessed surface 83 and a non-recessed surface 84. As can be seen, the non-recessed surface 84 of the base 81 extends beyond the recessed surface 83 of the base 81 to form legs at the base 81 of the shell 41. These legs formed by the non-recessed surface 84 of the base 81 help to stabilize the firebox 39 while in use with a grill 1.

Extending from the base 81 of the shell 41 is a sidewall 85 of the shell 41. The sidewall 85 has an exterior surface 87 that defines the outer peripheral 42 surface of the firebox 39. The inner peripheral surface 89 of the sidewall 85 will abut against the insulation layer 43 or provide a wall of the insulation layer 43 in the event an air pocket is used as the insulation layer 43.

The shell 41 also includes an opening 91 that extends through the shell 41 and aligns with the corresponding openings of the insulation layer 43 and the firebrick layer 45 to form the port opening 69 (see FIG. 4).

The shell 41 can be made of any material generally known in the art that is capable of withstanding the operating conditions within a grill 1, such as, but not limited to sheet metal. As will also be understood, the shell 41 can be formed from a single piece of material that is generally known in the art or multiple pieces of material that are generally known in the art.

Figure 7:
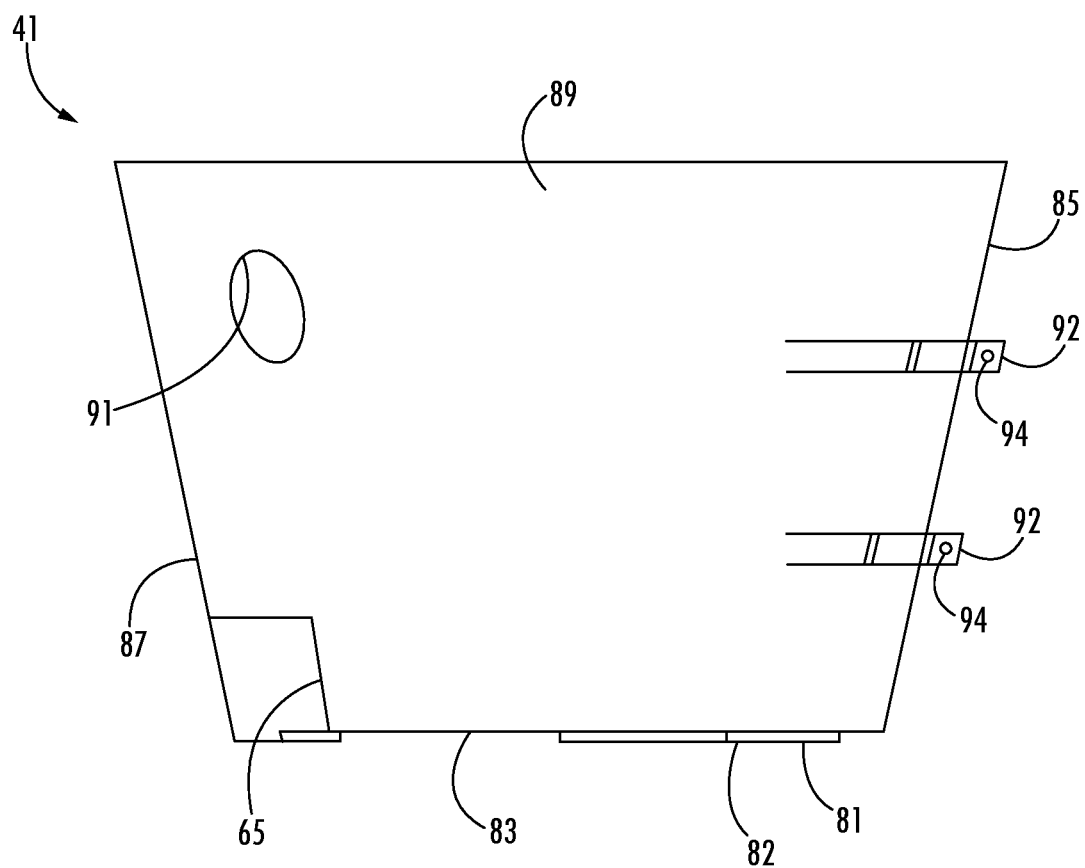
FIG. 7 illustrates a cross-sectional side view of the shell illustrated in FIG. 6.

With reference to FIG. 6 and FIG. 7, illustrating a cross-sectional side view of the shell 41 of FIG. 6, the shell 41 is illustrated as having a single piece design.

In a preferred embodiment, the shell 41 is made from a single piece of rolled and/or stamped sheet metal. In FIG. 6, the embodiment of the shell 41 is a single piece design, the exterior surface 87 of the sidewall 85 include a first set of coupling notches 92 adjacent a first end 88 of the shell 41 and a second set of corresponding coupling notches 92' adjacent a second end 93 of the shell 41.

As best illustrated in FIG. 7, the coupling notches 92, 92' have apertures 94 so that a coupling member can be inserted through a coupling notch 92 adjacent the first end 88 of the shell 41 and then through a corresponding coupling notch 92' on the second end 93 of the shell 41. The coupling member can then be used to pull together the first end 88 and the second end 93 of the shell 41, such that the first end 88 of the shell 41 overlaps with the second end 93 of the shell 41 to form an overlapping section 98 of the shell 41 (see FIG. 6).

As will also be understood, the single piece design that uses the coupling notches 92, 92' provides the additional benefit of holding the firebricks 47 in place when coupled together with the coupling member, while also being able to remove the coupling members to repair or replace all of or a portion of the insulation layer 43 or repair or replace any fractured firebricks 47 in the firebrick layer 45.

As will also be understood, when the shell 41 is filled with firebricks 47 and the coupling member pulls together the first end 88 and the second end 93 of the shell 41 it will cause the individual firebricks 45 to be pulled closer together until the firebricks 45 are abutting or almost abutting their adjacent firebricks 47, such that the firebricks 47 form a continuous firebrick layer 45 about the inner peripheral surface 42 of the firebox 39 (see FIGS. 3-5). As will also be understood, in the event that one of the firebricks 45 becomes fractured the shell 41 may also prevent air from flowing through the fractured firebrick 45.

Therefore, the inclusion of the shell 41 in the firebox 39 of the present application allows for the grill 1 to remain functional in the event of a fracture of a firebrick 45 in the firebrick layer 47 because the shell 41 provides support the firebrick 47 that has fractured to help prevent the firebrick 47 from falling apart or collapsing and may also prevent air from flowing through the fracture in the firebrick 47 from disrupting the air flow of the grill 1.

Figure 8:
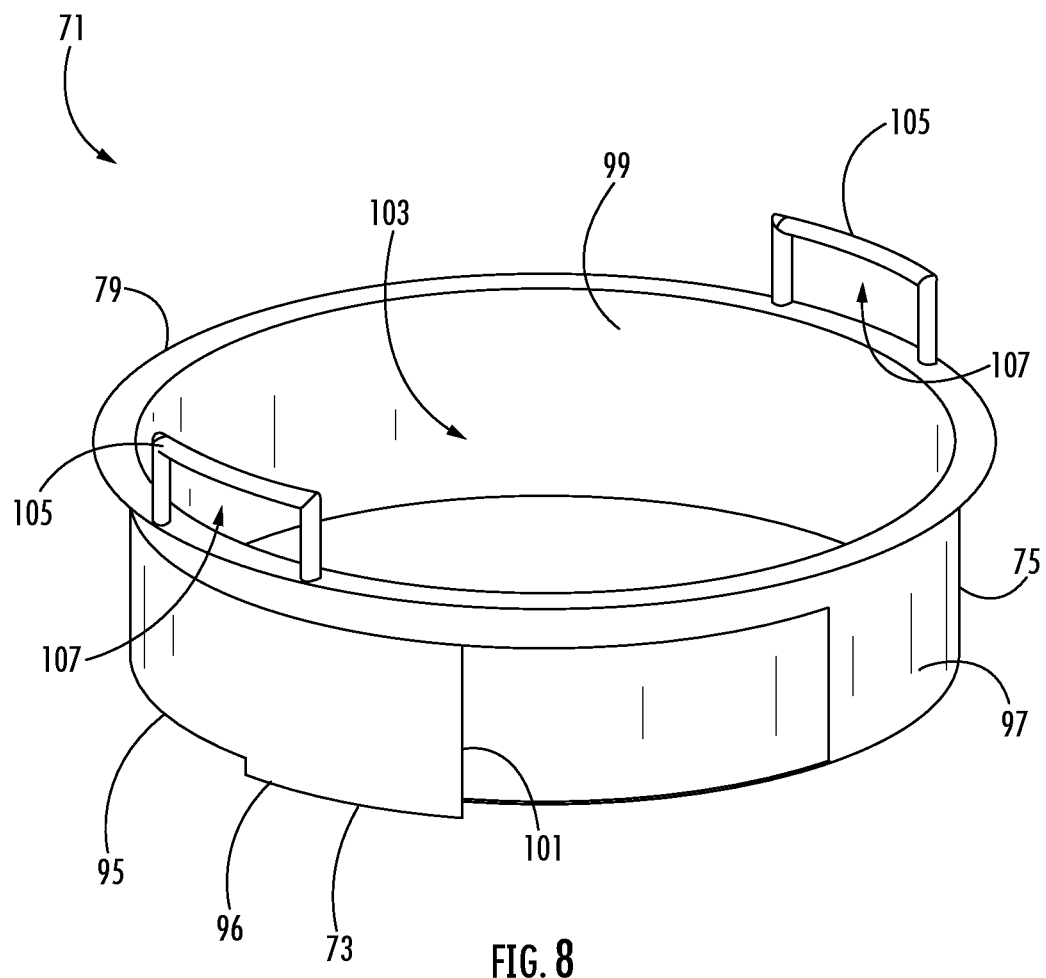
FIG. 8 illustrates a perspective view of the ash pan of the firebox illustrated in FIG. 3.
Figure 9:
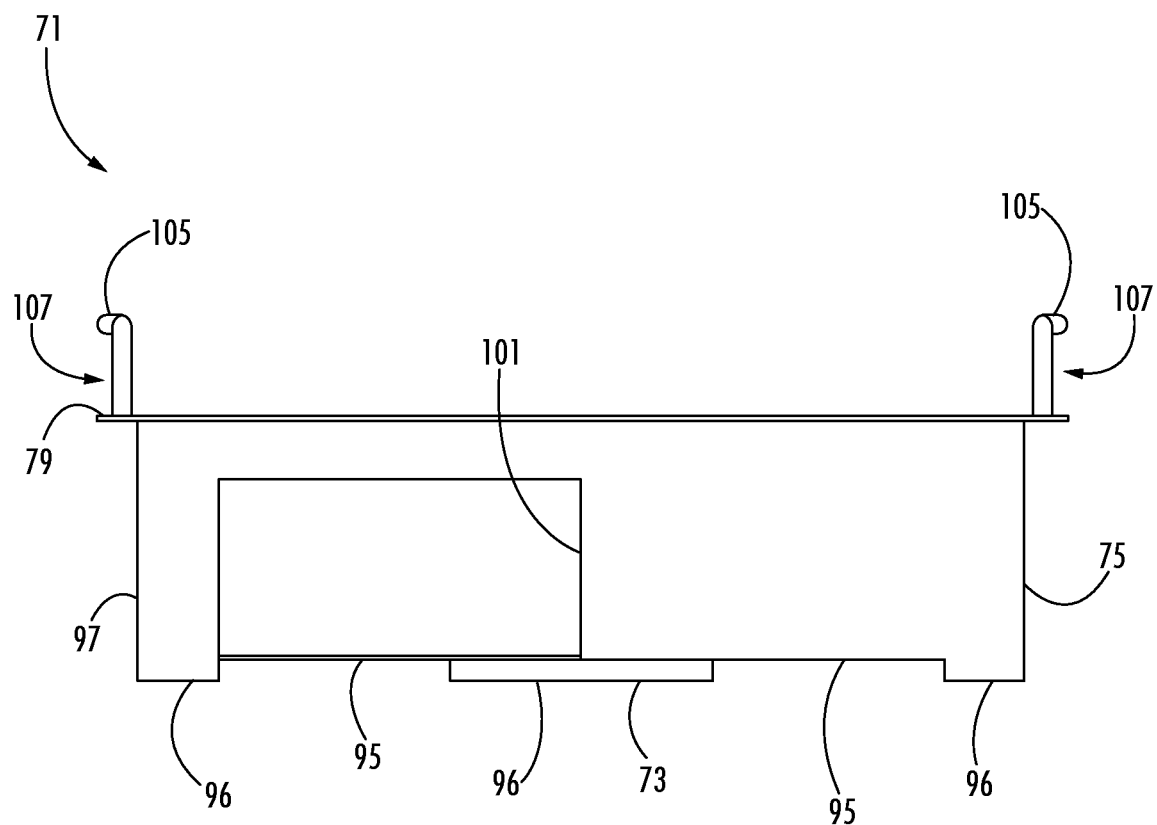
FIG. 9 illustrates a cross-sectional side view of the ash pan illustrated in FIG. 7.

Turning to FIG. 8, illustrating a perspective view of the ash pan 71 of the firebox 39 illustrated in FIG. 3.

As discussed above, ash pan 71 includes a base 73, a sidewall 75 extending from the base 75, and a lip 79 that radially extends from the sidewall 75 that forms a surface for holding the basket 55 of the firebox 39.

The base 73 of the ash pan 71 has a recessed portion 95 and a non-recessed portion 96. The non-recessed portion 96 act as legs that project from the base 73 of the ash pan 71 relative to the recessed portion 95. The legs formed by the non-recessed portion 96 of the base 73 act to keep a majority of the base 73 of the ash pan 71 elevated above the bottom 4 of the body 3 of the grill 1 when the ash pan 71 is being used, which prevents heat from the ash pan 71 dissipating into the body 3 of the grill 1 (see FIG. 1).

The sidewall 75 of the ash pan 71 has an exterior surface 97 and an interior surface 99. The sidewall 75 has an air inlet 101 that allows for the passage of air through the sidewall 75 and into an internal cavity 103 of the ash pan 71 that is defined by the interior surface 99 of the sidewall 75.

The ash pan 71 also has handles 105 on opposing sides of the lip 79 of the ash pan 71. The handles 105 are shaped to form a handle opening 107 capable of being grasped by a human hand.

As will be understood, the internal cavity 103 of the ash pan 71 is where any debris, such as ash, will be collected as it falls from the burning of the burning material being used to heat the grill 1.

For easy cleaning, a user can grasp the ash pan 71 via the handle opening 107 formed by the handles 105 to lift the ash pan 71 from the internal cavity 49 of the firebox 39 and empty the debris collected in the ash pan 71.

After cleaning out the ash pan 71, the user can then re-insert the ash pan 71 within the internal cavity 49 of the firebox 39 and replace the other components of the firebox 39 atop the ash pan 71.

In addition, having the ash pan 71 be inserted into and lifted out of the firebox 39 for cleaning allows for the capacity of the ash pan 71 to be increased over ash pans currently known in the field of art that are located underneath a grill or pulled out the side of the grill from below the grate.

Figure 14:
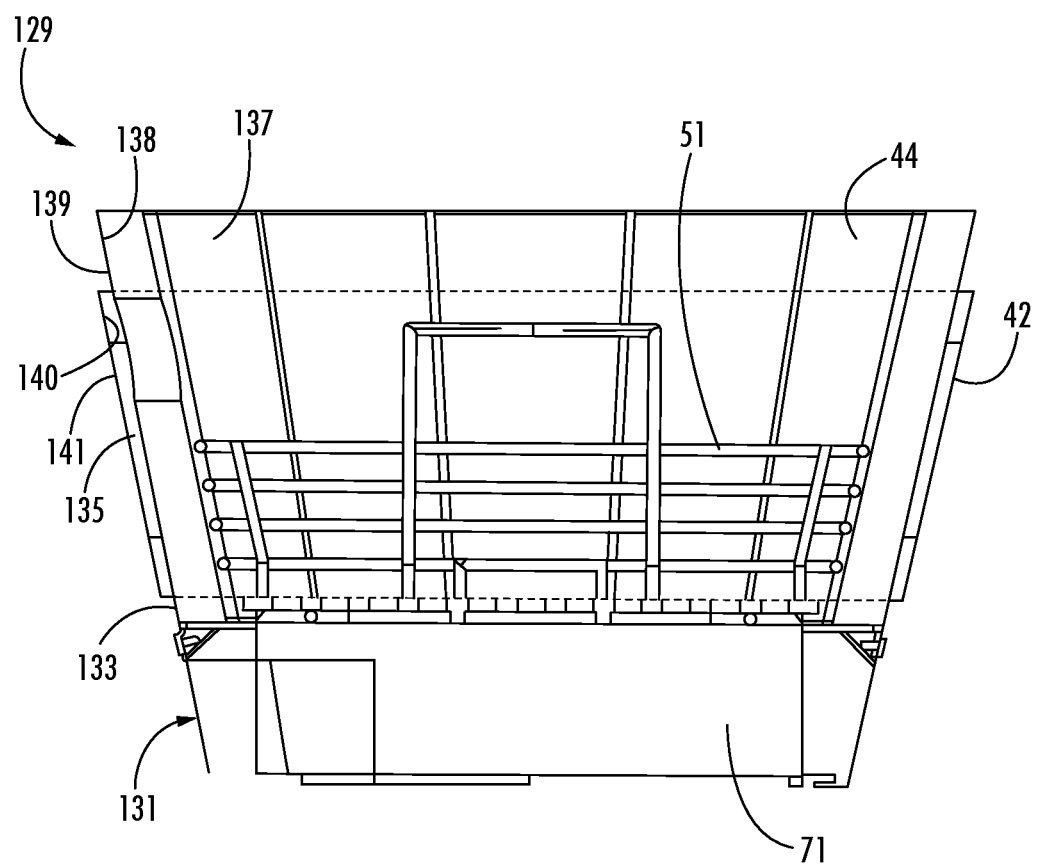
FIG. 14 is an exemplary embodiment of a firebox according to one aspect of the present application.

Turning to FIG. 14, illustrating another embodiment of a firebox 129 according to the principles of the present application. The firebox 129 includes all of the features of the firebox 39 illustrated in FIGS. 3 and 4 including a lift out ash pan 71 and basket 51 with the exception that the firebrick layer 137 is resting against the inner peripheral surface 138 of the shell 133 and the insulation layer 135 is formed between the outer radial surface 139 of the shell 133 and an inner peripheral surface 140 of a shield 141 that surrounds the outer radial surface 139 of the shell 133.

As will be understood, the shield 141 can be made of any material generally known in the art that is capable of withstanding the operating conditions within a grill 1, such as, but not limited to sheet metal.

Figure 15:
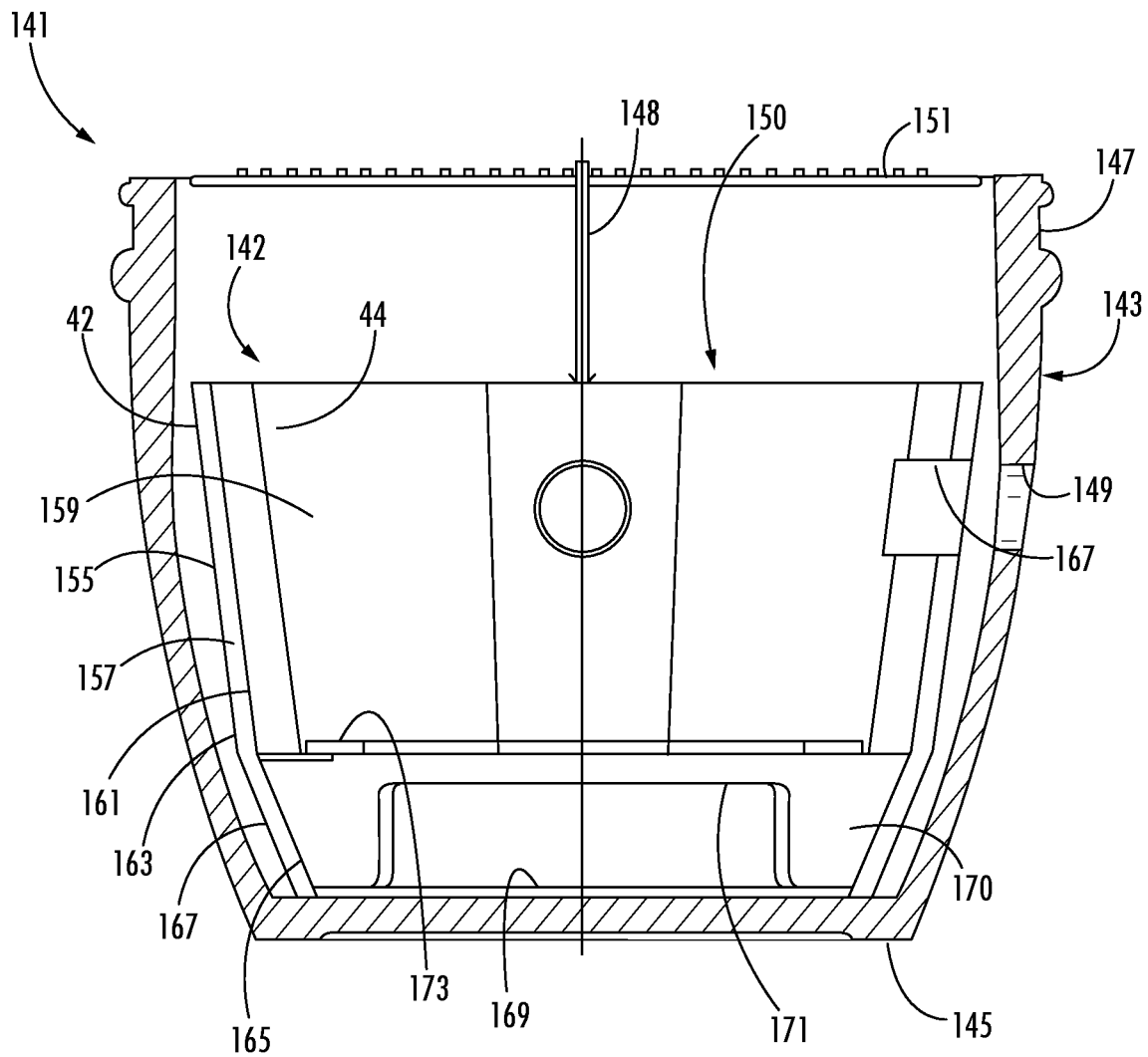
FIG. 15 is an exemplary embodiment of firebox according to one aspect of the present application being used with a traditional ceramic charcoal style grill.

Turning to FIG. 15, illustrating an embodiment of a charcoal style grill 141, such as, but not limited to, the charcoal style grills disclosed by U.S. Pat. Nos. 5,076,252; 4,836,179; 4,453,530; 4,777,927; and 4,535,749 whose entire disclosure is incorporated herein by reference, and an embodiment of a firebox 142 for use with the charcoal style grill 141.

The grill 141 has a body 143 having a base 145 and a sidewall 147 that radially extends around the base 145. The sidewall 147 of the grill 141 has a port opening 149 for access the internal cavity 150 of the grill 141 without having to open the lid of the grill 141. This provides the benefit of allowing the user to insert charcoal or other combustible material into the grill 141 without having to remove the top of the grill 141. The grill 141 also has a cooking grid 151 to hold the food to be cooked by the frill 141. The cooking grid 151 is supported by a metal stand 148, which is in turn supported by the firebox 39.

Inside the internal cavity 150 of the grill 141 is firebox 142 according to one aspect of the present application. The firebox 142 having a shell 155, an insulation layer 157, and a firebrick layer 159. In the illustrated embodiment, the shell 155 has a double wall design where the shell has an inner wall 161 and an outer wall 163 and the insulation layer 157 is spaced between the inner wall 161 and the outer wall 163 of the shell 155.

The space provided between the inner wall 161 and the outer wall 163 of the shell 155 can be filled with any type of insulation material, such as, fibrous insulation material, air bubble insulation material, or any other material that helps to prevent heat transmission through the shell 155 via convection.

In another embodiment, the space between the inner wall 161 and the outer wall 163 of the shell 155 can simply be left unfilled, such that the air pocket formed between the inner wall 161 and the outer wall 163 of the shell will act as the insulation layer 157 for the firebox 142.

Further, as is also illustrated, the outer wall 144 and the inner wall 145 of the shell 143 each have respective tapered regions 165, 167. As will be understood, many grills 141 have a rounded or oval shape which causes the internal cavity 150 of the grill 141 to be narrower towards the base 145 of the grill 141.

Therefore, to maximize the volume provided by the internal cavity 150 of the grill 141 it may be beneficial for the firebox 142 to have a shell 143 with tapered regions 165, 167 in order to allow for the full insertion of the firebox 142 into the grill 141, such that it makes contact with the base 145 of the grill 141, as well as to provide for easier insertion and removal of the firebox 142 from the grill 141.

The firebox 142 also includes a lift out ash pan 170 having an air inlet 171 that allows for air to flow to combustion material that is burned on the grate 173 being supported atop the ash pan 169.

As will also be understood, the firebox 142 illustrated in FIG. 15 can include any of the features previously discussed in the application, such as, but not limited to, a lift out basket, such as the basket 51 illustrated in FIGS. 3 and 4 of the present application.

As will be understood, the firebox 39 of the present application is not limited to being used with any specific type of grill 1.

Indeed, the Applicants believe that fireboxes 39 made according to the principles of the present application may be used with any type of grill, stove, or oven generally known in the art, such as but not limited to, gas grills, charcoal grills, kamado grills, ovens, or any device that is used to cook food by heating it from below.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A removable firebox for a Kamado grill having a ceramic body defining a lower internal cavity and lid defining an upper internal cavity, the ceramic body further defining an air inlet proximate a bottom of the lower internal cavity that may be variably opened and closed by a draft door, the lid further defining an outlet proximate a top of the upper internal cavity that may be variably opened and closed by a top cap having vents therethrough, comprising:
   a metallic shell forming an inverted conical frustum having a smaller diameter end configured to be positioned proximate the bottom of the lower internal cavity of the ceramic body;
   a plurality of firebricks positioned side-by-side around an inner periphery of the metallic shell to form an inner firebox cavity that does not have a bowl portion, the firebricks having an outer surface that cooperates with an inner surface of the metallic shell that is configured to form a plurality of air pockets therebetween;
   a fire grate positioned proximate the smaller diameter end at the bottom of the inverted conical frustum; and
   wherein the metallic shell prevents airflow from the lower internal cavity through the side-by-side positioned firebricks and into the inner firebox cavity, the metallic shell allowing airflow from the lower internal cavity through the smaller diameter end at the bottom of the inverted conical frustum and into the inner firebox cavity.

2. The firebox of claim 1, wherein the shell defines a firebox air inlet at the smaller diameter end at the bottom of the inverted conical frustum to allow airflow from the air inlet of the ceramic body to flow into the inner firebox cavity.

3. The firebox of claim 2, wherein at least one of the plurality of firebricks includes an opening proximate the firebox air inlet to accommodate the airflow from the air inlet of the ceramic body to flow into the inner firebox cavity.

4. The firebox of claim 2, wherein the plurality of firebricks extend from a larger diameter end of the inverted conical frustum to a position proximate a top of the firebox air inlet at the smaller diameter end at the bottom of the inverted conical frustum to accommodate the airflow from the air inlet of the ceramic body to flow into the inner firebox cavity.

5. The firebox of claim 4, further comprising an ash pan removably insertable within the inner firebox cavity below the fire grate.

6. The firebox of claim 5, wherein the ash pan is removably insertable within the inner firebox cavity below the fire grate below a vertical extent of the plurality of firebricks.

7. The firebox of claim 5, wherein the ash pan includes a lip formed at an upper extent thereof and configured to accommodate the fire grate thereon.

8. The firebox of claim 5, wherein the ash pan includes an ash pan air inlet positioned such that it can be aligned with the firebox air inlet at the smaller diameter end at the bottom of the inverted conical frustum to accommodate the airflow from the air inlet of the ceramic body to flow into the inner firebox cavity.

9. The firebox of claim 1, further comprising a basket for holding the fire grate removably insertable within the inner firebox cavity.

10. The firebox of claim 1, wherein the metallic shell defines a first port opening therethrough and wherein one of the plurality of firebricks defines a second port opening therethrough such that a passage is defined from the lower internal cavity to the inner firebox cavity.

11. The firebox of claim 1, wherein the shell has an exterior surface having a first coupling notch adjacent a first end of the shell and a second coupling notch adjacent a second end of the shell, and wherein a coupling member is removably coupled to the first and second coupling notch to pull together the first end and second end of the shell to hold the plurality of firebricks positioned side-by-side around an inner periphery of the metallic shell.

12. The firebox of claim 11, wherein the coupling member pulls together the first and second end of the shell such that the first and second end of the shell form an overlapping section on the shell.

13. The firebox of claim 1, further comprising an insulation layer positioned on an outer radial surface of the shell and an inner peripheral surface of a shield.

14. The firebox of claim 1, wherein the shell comprises an inner wall and an outer wall, further comprising an insulation layer positioned between the inner wall and outer wall of the shell.

15. A Kamado grill, comprising:
- a ceramic body defining a lower internal cavity and an air inlet proximate a bottom of the lower internal cavity that may be variably opened and closed by a draft door;
- a lid defining an upper internal cavity and an outlet proximate a top of the upper internal cavity that may be variably opened and closed by a top cap having vents therethrough;
- a firebox positioned within the lower internal cavity and including:
  - a metallic shell forming an inverted conical frustum having a smaller diameter end configured to be positioned proximate the bottom of the lower internal cavity of the ceramic body;
  - a plurality of firebricks positioned side-by-side around an inner periphery of the metallic shell to form an inner firebox cavity that does not have a bowl portion, the firebricks having an outer surface that cooperates with an inner surface of the metallic shell that is configured to form a plurality of air pockets therebetween;
  - a fire grate positioned proximate the smaller diameter end at the bottom of the inverted conical frustum; and
  - wherein the metallic shell prevents airflow from the lower internal cavity through the side-by-side positioned firebricks and into the inner firebox cavity, the metallic shell allowing airflow from the lower internal cavity through the smaller diameter end at the bottom of the inverted conical frustum and into the inner firebox cavity.

16. A removable firebox for a grill having a body defining a lower internal cavity and lid defining an upper internal cavity, the body further defining an air inlet proximate a bottom of the lower internal cavity that may be variably opened and closed by a draft door, the lid further defining an outlet proximate a top of the upper internal cavity that may be variably opened and closed by a top cap having vents therethrough, comprising:
- a metallic shell forming an inverted conical frustum having a smaller diameter end configured to be positioned proximate the bottom of the lower internal cavity of the body, the smaller diameter end defining an air inlet in a sidewall of the metallic shell;
- a plurality of firebricks positioned side-by-side around an inner periphery of the metallic shell to form an inner firebox cavity that extends from a larger diameter end of the inverted conical frustum to a top of the air inlet defined in the sidewall at the smaller diameter end;
- a fire grate positioned proximate the smaller diameter end at the bottom of the inverted conical frustum; and
- wherein the shell has an exterior surface having a first coupling notch adjacent a first end of the shell and a second coupling notch adjacent a second end of the shell, and wherein a coupling member is removably coupled to the first and second coupling notch to pull together the first end and second end of the shell to hold the plurality of firebricks positioned side-by-side around an inner periphery of the metallic shell.

17. The firebox of claim 16, wherein an outer wall of the firebricks is configured to cooperate with an inner wall of the metallic shell to provide air gaps therebetween.

18. The firebox of claim 17, further comprising an insulation layer positioned on an outer radial surface of the shell and an inner peripheral surface of a shield.

19. The firebox of claim 16, wherein the metallic shell defines a first port opening therethrough and wherein one of the plurality of firebricks defines a second port opening therethrough such that a passage is defined from the lower internal cavity to the inner firebox cavity.

* * * * *